UNITED STATES PATENT OFFICE.

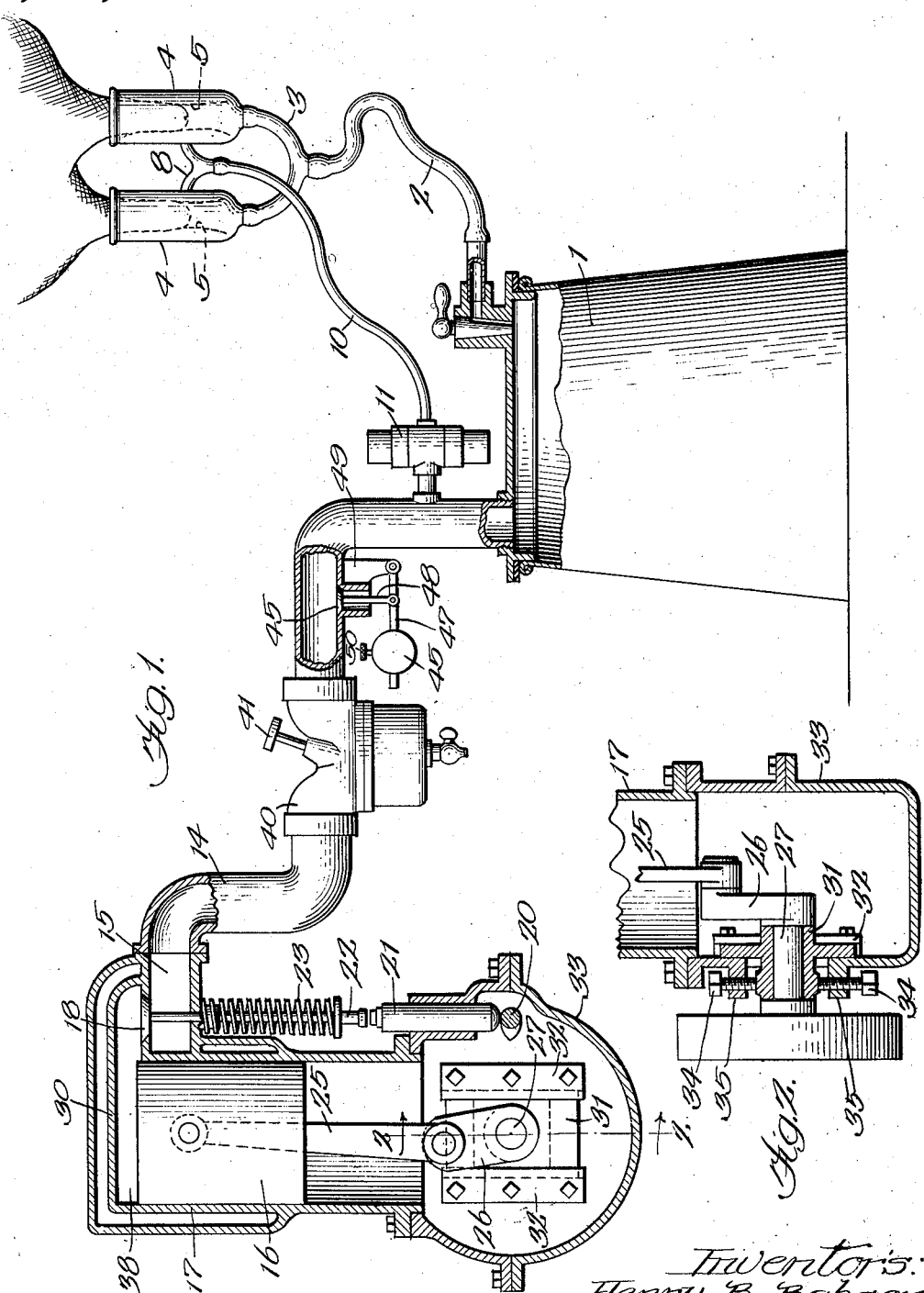

HENRY B. BABSON, OF CHICAGO, ILLINOIS, AND ARTHUR C. MACARTNEY, OF SYRACUSE, NEW YORK.

MILKING-MACHINE SYSTEM.

1,329,451.  Specification of Letters Patent.  Patented Feb. 3, 1920.

Application filed December 16, 1918. Serial No. 266,863.

*To all whom it may concern:*

Be it known that we, HENRY B. BABSON, residing at Chicago, in the county of Cook and State of Illinois, and ARTHUR C. MACARTNEY, residing at Syracuse, in the county of Onondaga and State of New York, HENRY B. BABSON being a citizen of the United States of America and ARTHUR C. MACARTNEY a subject of the King of Great Britain, have invented a certain new and useful Improvement in Milking-Machine Systems, of which the following is a specification.

This invention relates to milking machine systems wherein a partial vacuum is employed in causing the animal to release the milk. It is common practice to construct milking machines with teat cups having a rigid casing provided with a flexible lining. A duct leads from the inside of the lining to the interior of the milk pail, and a constant vacuum is maintained in this duct to facilitate the flow of milk to the pail. A separate duct leads from the space between the casing and the lining. Air pulsations are generated in this latter duct with the result that the lining alternately expands and contracts, thus producing a mechanical effect upon the teat and assisting in obtaining the release of the milk. Our system is well adapted to this type of milking machine, especially where the pulsating air is in the form of a varying degree of vacuum, or an alternation between a partial vacuum and atmospheric pressure. It has been common practice heretofore to obtain a vacuum by employing a vacuum pump driven by a motor together with a pulsator for varying the degree of vacuum in the duct leading to the space between the casing and the lining of the teat cup. One of the objects of our invention is to provide milking apparatus having one less than the usual number of elements. This object we obtain, briefly by employing a motor in the form of an internal combustion engine having a reciprocating piston. Instead of connecting the engine to an air pump we dispense with the pump and connect the vacuum pipe line or storage vessel of the milking machine direct to the intake of the engine so that when the piston draws air into the engine cylinder the air will be drawn from the pipe line or vacuum storage vessel, and create the desired vacuum therein. Another object of the invention is to render it possible and practical under all conditions to thus connect the air intake of the engine to the vacuum vessel of the milking machine. This we accomplish by providing a relief valve in the duct leading from the vacuum vessel to the engine so that if the degree of vacuum becomes excessive air may be drawn in to an extent sufficient to sustain combustion and insure the engine against stalling for lack of a proper charge. Another object is to provide means for regulating the degree of vacuum obtainable, and this we accomplish by providing means for regulating the amount of clearance in the engine. The closer the piston approaches to the closed end of the cylinder the less air or other gas there will be in the cylinder when the piston commences its suction stroke, and hence the less air or gas there will be present for lowering the degree of vacuum obtainable on the suction stroke. Consequently, by decreasing the clearance in the engine, the amount of air removed from the system at each suction stroke of the engine, will be increased.

We obtain our objects by the apparatus illustrated in the accompanying drawings in which—

Figure 1 is a more or less diagrammatic view showing the entire system.

Fig. 2 is a sectional detail of the adjustable shaft bearing of the engine, the section being taken on the line 2—2, Fig. 1.

Similar numerals refer to similar parts in the two views.

In the type of milking machine selected to illustrate the invention the milk pail 1 has a milk duct 2 leading from a claw 3. This claw is connected to the rigid casings 4 of which there are four, as usual, although but two are apparent in the drawing. The claw communicates with the inside of the linings 5 for creating a constant vacuum in them. A second claw 8 leads from the spaces between the linings and the casings for creating a pulsating vacuum in them. This second claw communicates with an air duct 10 connected to a pulsator 11. The pulsator may be of any suitable type and as these devices are well known it will not be necessary to give a detailed description here. A suitable pulsator is fully described and shown in Macartney Patent 1,266,296, granted May 21, 1918. The pulsator is connected to a pipe 14 which leads to the intake 15 of the engine. It will be sufficient for the present purpose to say that the pulsator, acting under the influence of the vacuum in pipe 14, produces air pulsations in the duct 10, the pipe 14 also communicating with the inside of the milk pail to exhaust the air therefrom.

The engine here selected for illustration may be regarded as being of the ordinary four cycle type, having a piston 16 reciprocating in a cylinder 17. The air intake valve 18 is operated from the usual cam shaft 20, said shaft actuating a push rod 21 which in turn operates the stem 22 of the valve. The valve is normally held closed by a spring 23 in the usual manner. The piston is connected to a connecting rod 25 which in turn is connected to the crank 26 secured to the crank shaft 27. The regulation of the amount of clearance in the engine may be accomplished in different ways, but according to the present design we make the shaft bearing adjustable toward and from the closed end 30 of the cylinder. The bearing 31 is slidable in guides 32 carried by the crank case 33. The bearing is adjusted by means of cap screws 34 screwing into lugs 35 formed on the crank case as shown in Fig. 2. By properly manipulating these screws the shaft bearing may be brought closer to or farther away from the closed end of the cylinder, thus decreasing or increasing the clearance or space 38 remaining between the piston and engine cylinder when the piston is commencing its suction stroke.

A carbureter 40 having a needle valve 41 is connected in pipe 14, its function being to supply combustible vapor to the engine when operating upon a liquid such as gasolene. Between the carbureter and the milk pail and pulsator is an air relief valve 45 normally held closed opening inward and by a weight 46 slidably mounted upon a lever 47 articulately connected to the stem 48 of the valve. The lever is fulcrumed upon a stationary bracket 49 and the weight is prevented by a set screw 50 from shifting accidentally.

In operation, let it be assumed that the teat cups are adjusted to the animal and that the engine is running. The suction caused by the moving of the engine piston 16 away from the closed end of the cylinder will draw air into the cylinder from the intake 15 and connecting pipe 14. This will create a vacuum in the pail and also provide the vacuum required to operate the pulsator 11. Under ordinary conditions the pulsator will admit atmospheric air to pipe 10 approximately sixty times a minute, and hence a considerable amount of air will be supplied to pipe 14 and the intake 15 through the pulsator. A certain amount of air will also be supplied, especially at the beginning of operations, from the milk pail 1. But if the amount of air thus supplied from the pulsator and milk pail is insufficient and the degree of vacuum in the pipe 14 becomes excessive, the relief valve 45 will be drawn open and admit air from the surrounding atmosphere. The point at which the valve will open will depend upon the position to which the weight 45 is adjusted upon the lever 47. It will be noted that whether the air comes from the pail, the pulsator or the relief valve, it will all have to pass the carbureter 40, the result being that the air entering the engine will have mixed with it the proper amount of combustible vapor to keep the engine running. If it be found that the suction produced by the engine piston is insufficient to create the degree of vacuum required, the suction may be increased by adjusting the piston farther in toward the closed end of the cylinder. By so doing, less gas will be present in the cylinder at the beginning of the suction stroke and hence less gas to dilute the vacuum. Consequently, the degree of vacuum created in the pipe 14 will be raised.

As a result of this invention a milking apparatus is obtained which has a reduced number of coöperating elements. Furthermore, the regulation is automatic for if the pulsator and milk pail do not furnish the required amount of air, the relief valve will open automatically, and will close automatically when the degree of vacuum again drops to normal.

Having thus described the invention what we claim as new and desire to secure by Letters Patent, is:—

1. A milking machine system having a pulsator for subjecting the milking apparatus to a pulsating vacuum, an internal combustion engine having an air intake connected to said pulsator for drawing air therefrom, said engine having a cylinder and a piston reciprocating therein, and means for varying the clearance in the engine to thereby vary the degree of vacuum obtainable in said intake.

2. A milking machine system having a pulsator for subjecting the milking apparatus to a pulsating vacuum, an internal combustion engine having an air intake connected to said pulsator for drawing air therefrom, said engine having a cylinder and a piston reciprocating therein, and means for varying the minimum distance of the piston from the closed end of the cylinder to thereby vary the clearance and regulate the degree of vacuum obtainable in said intake.

3. A milking machine system having a pulsator for subjecting the milking apparatus to a pulsating vacuum, an internal combustion engine having an air intake connected to said pulsator for drawing air therefrom, said engine having a cylinder, a piston reciprocating in the cylinder, a crank shaft, a crank fastened to said shaft, a connecting rod connecting the crank to the piston, and means for varying the distance of the crank shaft from the closed end of the cylinder.

4. A milking machine system having a pulsator for subjecting the milking apparatus to a pulsating vacuum, an internal combustion engine having an air intake connected to said pulsator for drawing air therefrom, said engine having a cylinder, a piston reciprocating in the cylinder, a connecting rod connected to the piston, a crank connected to the connecting rod, a crank shaft fastened to the crank, a bearing for said crank shaft, and means for varying the distance of said bearing from the closed end of the cylinder.

5. A milking machine system having a milk pail, a pulsator, a teat cup having a casing provided with a flexible lining, a duct leading from inside the lining to the inside of the pail, a duct leading from the space between the lining and the casing to the pulsator, and an internal combustion engine having an air intake leading from the inside of the pail and from the pulsator, whereby the suction of the engine produces a partial vacuum in the pail and at the pulsator.

6. A milking machine system having a milk pail, a pulsator, a teat cup having a casing provided with a flexible lining, a duct leading from inside the lining to the inside of the pail, a duct leading from the space between the lining and the casing to the pulsator, an internal combustion engine having an air intake leading from the inside of the pail and from the pulsator, whereby the suction of the engine produces a partial vacuum in the pail and at the pulsator, and a relief valve in said intake for admitting air from the outside in case the degree of vacuum becomes excessive.

7. A milking machine system having a milk pail, a pulsator, a teat cup having a casing provided with a flexible lining, a duct leading from inside the lining to the inside of the pail, a duct leading from the space between the lining and the casing to the pulsator, an internal combustion engine having an air intake leading from the inside of the pail and from the pulsator, whereby the suction of the engine produces a partial vacuum in the pail and at the pulsator, a relief valve in said intake for admitting air from the outside in case the degree of vacuum becomes excessive, and means for regulating the action of said relief valve to vary the degree of vacuum at which it will open.

8. A milking machine system having vacuum cups adapted to coöperate with the teats of the animal, and an internal combustion engine, the air intake of the engine being connected to said cups for creating a vacuum there.

In witness whereof we have hereunto subscribed our names.

HENRY B. BABSON.
ARTHUR C. MACARTNEY.